United States Patent [19]

Tanimoto et al.

[11] Patent Number: 4,658,374
[45] Date of Patent: Apr. 14, 1987

[54] ALPHABETIZING JAPANESE WORDS IN A PORTABLE ELECTRONIC LANGUAGE INTERPRETER

[75] Inventors: Akira Tanimoto, Kashihara; Sigeaki Masuzawa, Nara, both of Japan

[73] Assignee: Sharp Kabushiki Kaisha, Osaka, Japan

[21] Appl. No.: 396,269

[22] Filed: Jul. 8, 1982

Related U.S. Application Data

[63] Continuation of Ser. No. 125,456, Feb. 28, 1980, abandoned.

[30] Foreign Application Priority Data

Feb. 28, 1979 [JP] Japan .............................. 54-26851[U]

[51] Int. Cl.$^4$ ......................... G06F 15/38; G06F 3/16
[52] U.S. Cl. .................................. 364/900; 364/419; 434/157; 434/167
[58] Field of Search ... 364/200 MS File, 900 MS File, 364/419; 434/156, 157, 167

[56] References Cited

U.S. PATENT DOCUMENTS

| | | | |
|---|---|---|---|
| 3,532,821 | 10/1970 | Nakata et al. | 381/51 |
| 4,158,236 | 6/1979 | Levy | 364/900 |
| 4,159,536 | 6/1979 | Kehoe | 364/900 |
| 4,193,119 | 3/1980 | Arase et al. | 364/900 |
| 4,215,240 | 7/1980 | Ostrowski | 381/51 |
| 4,328,562 | 5/1982 | Hashimoto et al. | 364/900 |
| 4,383,306 | 5/1983 | Morimoto et al. | 364/900 |
| 4,393,462 | 7/1983 | Tanimoto et al. | 364/900 |
| 4,489,396 | 12/1984 | Hashimoto et al. | 364/900 |
| 4,579,533 | 4/1986 | Anderson et al. | 434/157 |

FOREIGN PATENT DOCUMENTS 2014765  8/1979  United Kingdom ................ 381/51

Primary Examiner—Archie E. Williams, Jr.
Attorney, Agent, or Firm—Birch, Stewart, Kolasch & Birch

[57] ABSTRACT

A portable electronic language interpreter includes an alphabetical keyboard for entering a particular Japanese word therein using a system of alphabetized Japanese. A retrieval circuit is responsive to the alphabetical keyboard for causing access of a memory containing a plurality of translated English words equivalent to a plurality of Japanese words. A decoder is provided for converting the alphabetized Japanese word into a word in the Japanese "Katakana" language equivalent thereto. A voice synthesizer is provided which generates an audible pronunciation of the input Japanese word. A display is connected to the alphabetical keyboard and the retrieval circuit and decoder for displaying the alphabetized Japanese word, the word represented in the Japanese "Katakana" language, and the translated English word. In a specific form of the present invention, the memory contains at least one pair of translated English words both having a meaning identical to the input Japanese word. In another specific form of the present invention, a phonetic-symbol keyboard may be provided for entering a sequence of phonetic symbols indicating an English word.

6 Claims, 5 Drawing Figures

ALPHABETIZING JAPANESE WORDS IN A PORTABLE ELECTRONIC LANGUAGE INTERPRETER

This application is a continuation of copending application Ser. No. 125,456, filed on Feb. 28, 1980, which is now abandoned.

BACKGROUND OF THE INVENTION

The present invention relates in general to a word information storage and retrieval device and, more particularly, to an electronic dictionary and language interpreter for providing efficient and rapid retrieval of any desired word or words stored therein.

Recently, a new type of electronic devices called an electronic dictionary and language interpreter has been available on the market. The electronic dictionary and language interpreter differs from any conventional type electronic devices in that the former is of a unique structure which provides for efficient and rapid retrieval of word information stored in a memory. An example of such electronic dictionary and language interpreter was disclosed in Levy U.S. Pat No. 4,158,236, June 12, 1979, "ELECTRONIC DICTIONARY AND LANGUAGE INTERPRETER".

In those portable devices, it is further desirable that an alphabetized Japanese word be usable therein. Moreover, it is additionally desirable to develop two or more translated words, if any, equivalent to a particular word entered therein.

SUMMARY OF THE INVENTION

Accordingly, it is the primary object of the present invention to provide an improved electronic language interpreter.

It is another object of the present invention to provide an improved electronic language interpreter comprising circuitry capable of entering a Japanese word therein using a system of alphabetized Japanese.

It is a further object of the present invention to provide an improved electronic language interpreter comprising circuitry for developing two or more translated words equivalent to a particular word entered.

It is a further object of the present invention to provide an improved electronic language interpreter comprising circuitry for providing pronunciation of two or more translated words equivalent to a particular word entered thereto.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a portable electronic language interpreter comprises an alphabetical keyboard for entering a particular Japanese word therein using a system of alphabetized Japanese. A retrieval circuit is responsive to the alphabetical keyboard for causing access of a memory containing a plurality of translated English words equivalent to a plurality of Japanese words. A decoder is provided for converting the alphabetized Japanese corresponding word into a word in the Japanese "Katakana" language. A voice synthesizer is provided which generates an audible pronunciation of the entered Japanese word. A display is connected to the alphabetical keyboard and the retrieval circuit and decoder for displaying the alphabetized Japanese word, the word represented in the Japanese "Katakana" language, and the translated English word.

In a specific form of the present invention, the memory contains at least one pair of translated English words both having a meaning identical to the input Japanese word. In another specific form of the present invention, a phoneticsymbol keyboard may be provided for entering a sequence of phonetic symbols indicating an English word.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

First of all, any language may be applied to a portable language interpreter of the present invention. An input "source" word or words are spelled in a specific language to obtain an equivalent word or words, or a translated word spelled in a different language corresponding thereto. The language may be freely selected. According to an example of the present invention, it is assumed that the specific language is Japanese and the different language is English.

Figure 1A:
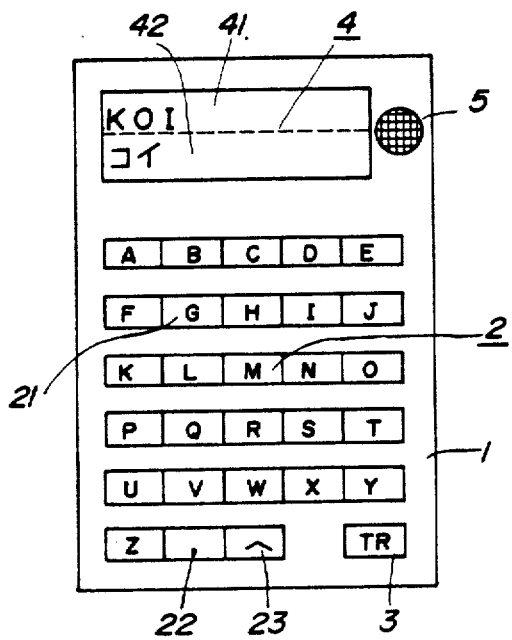
FIGS. 1(A) and 1(B) are plan views of a portable electronic interpreter of the present invention.
Figure 1B:
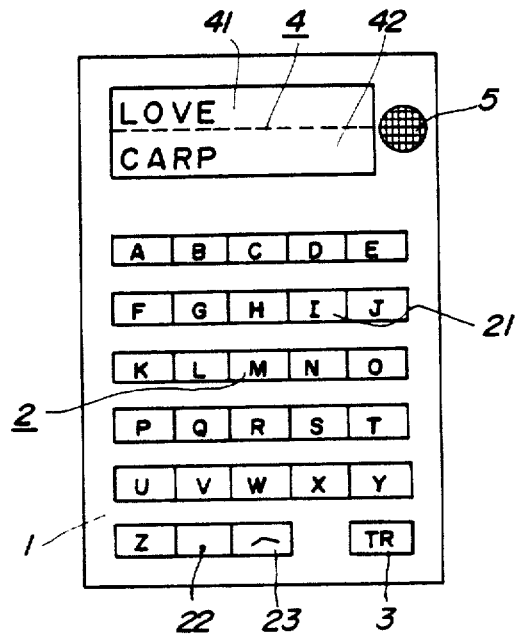

With reference to FIGS. 1(A) and 1(B), a portable electronic language interpreter of the present invention comprises a main frame 1, an alphabetical keyboard 2, a translation key 3, a two-storied display 4 and a speaker 5. The alphabetical keyboard 2 contains a plurality of alphabetical key switches 21 arranged in alphabetical order. Selected ones of the plurality of alphabetical key switches 21 are actuated to enter a Japanese word according to a system of alphabetizing Japanese. The translation key 3 is activated to cause retrieval of two or more English translated words equivalent to the Japanese word entered by the alphabetical key switches 21.

When the selected alphabetical key switches 21 are actuated to enter a particular Japanese word, the two-storied display 4 indicates the alphabetized Japanese word in its upper indicator 41 and simultaneously displays the entered Japanese word represented in Japanese "Katakana" in its lower indicator 42. By virtue of the two-storied indication of both the alphabetized Japanese word and the Japanese "Katakana" word, the correctness of the input Japanese is assured.

When the translation key 3 is activated, the two-storied display 4 indicates one or more English translated words equivalent to the entered Japanese word and after retrieval by the translator of the present invention. In response to the actuation of the translation key 3, the speaker 5 provides sound reproduction of the entered Japanese word in the Japanese language as entered.

The pronunciation of the input word or words is carried out in the same form as one reads it, and the spelling or alphabetizing of the same may be developed according to examples of the present invention.

FIG. 1(A) represents the indication by the two-storied display 4 in which a particular Japanese word "KOI" has been entered into the electronic language interpreter by means of the alphabetical key switches. FIG. 1(B) shows the display 4 indicating two English translated words "LOVE" and "CARP" which are obtained by the retrieval.

The alphabetical keyboard 2 further includes a comma key 22 and a long-vowel key 23. The comma key 22 is actuated to enter information useful for the purpose of separating the letter "N" from the following vowel or "Y", in order to clear identification of the Japanese word entered. The long-vowel key 23 is activated to apply information for indicating a long-vowel.

Figure 2:
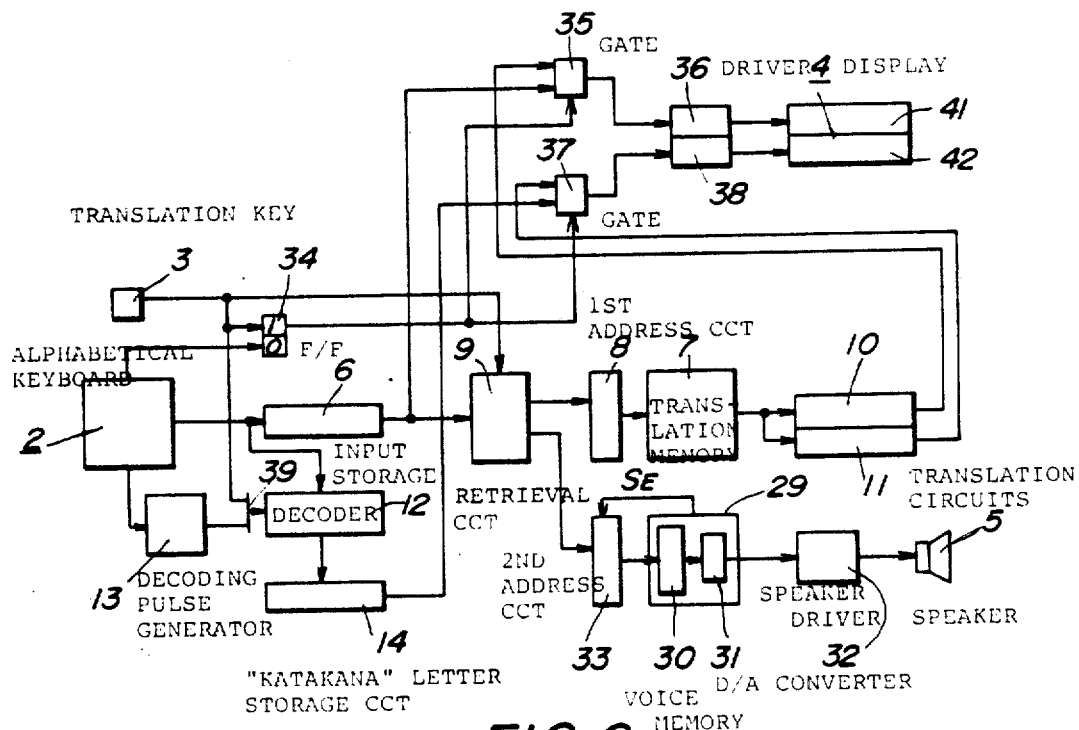
FIG. 2 is a block diagram of a control circuit incorporated within the portable electronic interpreter shown in FIGS. 1(A) and 1(B)

FIG. 2 shows a block diagram of a control circuit incorporated within the portable language interpreter shown in FIGS. 1(A) and 1(B). Like elements corresponding to those of FIGS. 1(A) and 1(B) are indicated by like numerals.

The control circuit comprises a input storage circuit 6, a translation memory 7, a first address circuit 8, a retrieval circuit 9, two translation storage circuits 10 and 11, a decoder 12, a decoding pulse generator 13, a "Katakana" letter storage circuit 14, a voice synthesizer 29, a voice memory 30, a D/A converter 31, a speaker driver 32, a second address circuit 33, a flip flop 34, two gates 35 and 37, two drivers 36 and 38, and an OR gate 39.

The input storage circuit 6 receives and stores a train of code information developed by the actuation of the selected alphabetical key switch 21, in the actuated sequence. The translation memory 7 contains a plurality of prestored English translated words. The first address circuit 8 functions to address the translation memory 7. When the entry of a particular Japanese word is completed and then the translation key 3 is actuated, the retrieval circuit 9 is responsive to the actuation of the translation key 3 for providing address signals to the first address circuit 8 according to output signals from the input storage circuit 6. The address signals are generated to direct the number of the address to be set in the first address circuit 8, depending on the output signals from the input storage circuit 6 representing its contents.

The translation memory 7 delivers one or more English translated words equivalent to the Japanese word entered, by the control of the first address circuit 8. The one or more English translated words are presented to the translation circuits 10 and 11.

In a case where there are present two English translated words equivalent to the Japanese word entered, it is assumed that the translation memory 7 generates two English translated words equivalent to it according to a preferred embodiment of the present invention. The translation memory 7 may contain and provide three or more English translated words equivalent to the Japanese word.

Provided that a particular word entered is a written representation of a sequence of phonetic symbols corresponding to an English word, at least one pair of English words having the same pronunciation as the sequence of the phonetic symbols may be examined and indicated in the display 4. In such a case, a keyboard comprising a plurality of phonetic-symbol key switches may be provided in place of the alphabetical keyboard 2.

Some examples of such English words are as follows:
1. Input phonetic symbols: [siː]
A pair of English words: see, sea.
2. [ðɛr]
there, their.
3. [sou]
so, sow.
4. [sʌn]
sun, son.
5. [sʌm]
some, sum.

In order to enable the retrieval of English translated words in response to the application of the phonetic symbols, it should be necessary that the retrieval circuit 9 is modified so as to provide the address signals according to the phonetic symbol information.

Turning back to a specific form of the present invention in which the Japanese word is entered in the form of alphabetized Japanese, the control circuit is further described in connection with a feature where the alphabetized Japanese word is converted to the corresponding Japanese "Katakana" representation with the result indicated on the display 4, and an additional feature that the Japanese word entered is audibly pronounced in the same form as one reads it, in response to the energization of the translation key 3. The Japanese word entered can be pronounced in the manner of spelling or alphabetizing the same.

The decoder 12 is responsive to alphabetical code information received from the alphabetical keyboard 2 for decoding it into "Katakana" code information of "Katakana" letters applied to the "Katakana" letter storage circuit 14. The decoding pulse generator 13 provides decoding pulse signals used to cause the decoder 12 to operate. The decoding pulse generator 13 develops the decoding pulse signals only under the condition that one of five vowel key switches 21, "A", "I", "U", "E", and "O", the comma key 22, or the long-vowel key 23 is actuated. The decoder 12 operates only when the decoding pulse signals are applied thereto or key information from the translation key 3 is entered thereto. The "Katakana" letter storage circuit 14 stores "Katakana" letters in the form of the "Katakana" code information developed from the decoder 12 in the developed order.

Figure 3:
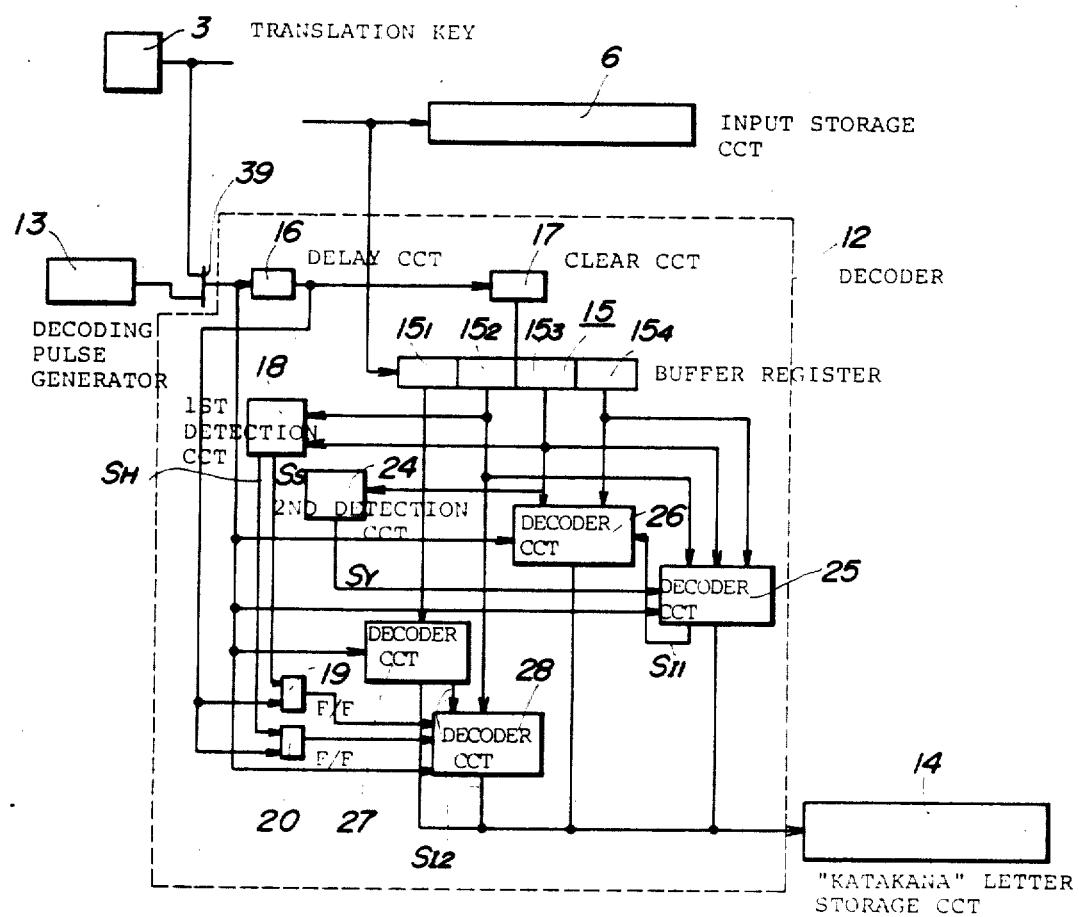
FIG. 3 is a more detailed block diagram of a decoder 12 and associated circuitry contained within the control circuit shown in FIG. 2.

FIG. 3 shows a more detailed block diagram of the decoder 12. Like elements corresponding to those of FIG. 2 are indicated by like numerals. With reference to FIG. 3, the decoder 12 comprises a buffer register 15, a delay circuit 16, a clear circuit 17, a first detection circuit 18, two flip flop circuits 19 and 20, a second detection circuit 24, and four decoder circuits 25, 26, 27, and 28.

The buffer register 15 comprises four storage locations $15_1$, $15_2$, $15_3$, and $15_4$ each having a capacity of digit of information. In response to the actuation of the alphabetic keyboard 2, the contents of the buffer register 15 are shifted left by one-digit and accordingly the alphabetical code information from the alphabetical keyboard 2 is admitted to the bottom or fourth-digit storage location $15_4$. In response to the application of the decoding pulse signals from the decoding pulse generator 13 or the key information from the translation key 3, the delay circut 16 generates output signals after the elapse of a certain time period. In response to the output signals from the delay circuit 16, the clear circuit 17 clears the buffer register 15.

The first detection circuit 18 compares the contents of the second-digit location $15_2$ with the contents of the third-digit location $15_3$. When they contain the same code information representing one alphabetical letter, with the exception that they both contain code information indicating "N", the first detection circuit 18 develops an output signal SS. When they include the same code information indicating "N", it provides an output signal SH. The output signal SS is applied to the flip flop circuit 19. The output signal SH is introduced into the flip flop circuit 20.

The flip flop circuit 19 is set by the application of the output signal SS. It is reset by the output signal from the delay circuit 16. The flip flop circuit 20 is set by the entry of the output signal SH and reset by the introduction of the output signal from the delay circuit 16. The second detection circuit 24 determines the contents of the third-digit location $15_3$, in which case it develops detection signal SY when the third-digit location $15_3$ contains code information of "Y".

The decoder circuit 25 operates to decode the contents of the second-digit location $15_2$, the third-digit location $15_3$, and the fourth-digit location $15_4$ into "Katakana" code information when the detection signals SY are developed and in addition either the decoding pulse signals or the key information from the translation key 3 is present. At the same time, the decoder circuit 25 applies a disabling signal SI1 to the decoder circuit 26, with the result that the decoder circuit 26 is prevented from operating its decoding function.

Assuming that the buffer register 15 includes code information of "KYA", when the decoder circuit 25 executes its decoding function so that "Katakana" code information equivalent to "KYA" is developed, the disenabling signal SI1 is developed from the decoder circuit 25.

As long as the disenabling signal SI1 is not generated and in addition either the decoding pulse signals or the key information from the translation key 3 are generated, the decoder circuit 26 performs its decoding operation on the contents of the third-digit location $15_3$ and the fourth-digit location $15_4$ converting them to "Katakana" code information. Provided that the buffer register contains "KA" in the form of code information, the decoder circuit 26 executes its decoding operation with the result that "Katakana" code information equivalent to "KA" is provided.

The decoder circuit 27 carries out its decoding operation in response to the supply of either the decoding pulse signals or the key information from the translation key 3. When the first-digit location $15_1$ of the buffer register 15 contains the code information of "N", the decoder circuit 27 generates a disabling signal SI2 which is applied to a different decoder circuit 28 and output signals designating "Katakana" code information corresponding to the syllabic nasal in the Japanese are produced. The disabling signal SI2 prevents the decoder circuit 28 from operating its decoding function. The output signals of the "Katakana" code information are provided to the "Katakana" letter storage circuit 14.

When the disabling signal SI2 is not developed, the output signals from the flip flop circuits 19 or 20 are placed in the high level, and thus, the decoding pulse signals or the key information from the translation key 3 are developed and the decoder circuit 25 is enabled. Consequently, when the flip flop circuit 19 generates its output signal at a high level, the decoder circuit 25 provides "Kattakana" code information corresponding to the assimilated sound. On the other hand, when the flip flop circuit 20 provides its output signal at a high level, it generates another type of "Katakana" code information equivalent to the syllabic nasal in Japanese.

In this form of the present invention, while two or more decoder circuits among the four decoder circuits 25 through 28 are activated according to the contents of the buffer register 15, the decoder circuit 25 or 26 operates its decoding function after the decoder circuit 27 or 28 completes its decoding operation. When the disabling signals SI1 or SI2 are not generated, the decoder circuit 26 or 28 operates its decoding function, respectively.

The "Katakana" letter storage circuit 14 receives the "Katakana" code information developed from the respective decoder circuits 25 through 28 in the order from the upper digit to the lower digit.

Some examples of the introduction of some of the Japanese words in the form of alphabetized Japanese and the function of the control circuit are as follows:

1. The Japanese word entered: "KANNEN"

Although the following "Katakana" code information developed and the contents of the "Katakana" letter storage circuit 14 are both represented in a word of alphabetized Japanese, in fact, they are "Katakana" of letters of Japanese.

| Actuated keys of the alphabetical keyboard 2 | Decoder circuit activated | "Katakana" code information developed | Contents of the "Katakana" letter storage circuit 14 |
|---|---|---|---|
| K A | 26 | "KA" | "KA" |
| N N E | 28, 26 | "N" (syllabic nasal) "NE" | "KANNE" |
| N TR | 26 | "N" (Syllabic nasal) | "KANNEN" |

2. "GEN'IN":

| | | | |
|---|---|---|---|
| G E | 26 | "GE" | "GE" |
| N ' | 26 | "N" (syllabic nasal) | "GEN'" |
| I | 26 | "I" | "GEN'I" |
| N TR | 26 | "N" (syllabic nasal) | "GEN'IN" |

3. "NIPPON":

| | | | |
|---|---|---|---|
| N I | 26 | "NI" | "NI" |
| P P O | 28, 26 | The assimilated sound, "PO" | "NIPPO" |

-continued

| | | | | |
|---|---|---|---|---|
| [N] [TR] | | 26 | "N" (syllabic nasal) | "NIPPON" |

4. "OBĀSAN":

| | | | | |
|---|---|---|---|---|
| [O] | | 26 | "O" | "O" |
| [B] [A] | | 26 | "BA" | "OBA" |
| □ | | 26 | "—" (long vowel) | "OBĀ" |
| [S] [A] | | 26 | "SA" | "OBĀSA" |
| [N] [TR] | | 26 | "N" (syllabic nasal) | "OBĀSAN" |

5. "GEKKYŪ":

| | | | | |
|---|---|---|---|---|
| [G] [E] | | | 26 | "GE" | "GE" |
| [K] [K] [Y] [U] | | 28, 25 | The assimilated sound, "KYU" | "GEKKU" |
| □ | | | 26 | "—" (long vowel) | "GEKKŪ" |
| [TR] | | | | | |

6. "KONKYŪ":

| | | | | |
|---|---|---|---|---|
| [K] [O] | | | 26 | "KO" | "KO" |
| [N] [K] [Y] [U] | | 27, 25 | "N" (syllabic nasal), "KYU" | "KONKYU" |
| □ | | | 26 | "—" (long vowel) | "KONKYŪ" |
| [TR] | | | | | |

7. "HENNYŪ":

| | | | | |
|---|---|---|---|---|
| [H] [E] | | | 26 | "HE" | "HE" |
| [N] [N] [Y] [U] | | 27, 25 | "N" (syllabic nasal), "NYU" | "HENNYU" |
| □ | | | 26 | "—" (long vowel) | "HENNYŪ" |
| [TR] | | | | | |

Furthermore, an additional feature of the present invention allows the Japanese word entered to be pronounced in the same form as one reads it, in response to the activation of the translation key 3. This feature is described below.

Turning back to FIG. 2, the control circuit additionally comprises a voice synthesizer system operable in conjunction with the above-mentioned translation system. The voice synthesizer system comprises the speaker 5, the voice synthesizer 28, the voice memory 30, the D/A converter 31, the speaker driver 32, and the second address circuit 33.

The voice synthesizer 29 contains the voice memory 30 and the D/A converter 31. The voice memory 30 preliminarily stores quantum voice information used for providing the pronunciation equivalent to the Japanese input word. The D/A converter 31 is operated to convert the quantum voice information from the voice memory 30 to analog information applied to the speaker driver 32. The speaker 5 is controlled by the speaker driver 32 so that the Japanese input word is pronounced in the same manner as it is read. The voice memory 30 contains a number of words in the form of quantum voice information in order to provide a plurality of different kinds of pronunciation according to a plurality of the Japanese input words. To provide the sound pronunciation corresponding to a plurality of letters of only one Japanese word, a plurality of words defined by the quantum voice information must be stored in the voice memory 16. Each of the plurality of words are placed in such a manner that they are positioned in the first region where the plurality of the words are arranged in a certain sequence on a one-step basis, and the second region where the end code information following the last word is stored for confirmation of the termination of the words.

The second address circuit 33 addresses the voice memory 16 to specify a certain number of words of the quantum voice information. The retrieval circuit 9 develops the address information applied to the first address circuit 8 for the translation memory 7 according to the code information stored in the input storage circuit 6, in response to the actuation of the translation key 3. At the same time, the retrieval circuit 9 generates address information to be applied to the second address circuit 33 for the voice synthesizer 29 for the purpose of directing the leading step of the voice memory 16, in and after which the plurality of the words of the quantum voice information to be developed are stored.

The second address circuit 33 is constructed so as to count up at a certain frequency when the address information is applied to the second address circuit 33. Therefore, the Japanese word in the form of the quantum voice information continues to develop, being specified by the detected leading step. The pronunciation of the input Japanese word or words is performed in the Japanese language.

Voice preventing signals SE are generated from the voice synthesizer 29 when the last code information is detected. The second address circuit 33 is then reset in response to the voice preventing signals SE so that the pronunciation is terminated. When the second address circuit 33 is placed in the reset state, the voice memory 33 is no longer addressed and the second address circuit 33 is prevented from counting up.

In accordance with the above-stated circuit configuration, the pronunciation of the input Japanese word is obtained in response to an actuation of the translation key 3.

In accordance with the introduction of the Japanese word by the alphabetical keyboard 2, the code information stored in the input storage circuit 6 and the "Katakana" code information, representing "Katakana" letters, applied to the "Katakana" letter storage circuit 14 are both transferred to the display 4 through the gates 35 and 37, and the drivers 36 and 38. In response to the actuation of the translation key 3, on the other hand, the translated English words stored in the two translation circuits 10 and 11 are transmitted to the display 4.

The flip flop 34 of R-S type is reset in response to the activation of the alphabetical keyboard 2. It is set upon the actuation of the translation key 3. The gate 35 passes the output signals from the input storage circuit 6 when the output of the flip flop 34 is at the low level. On the other hand, when the flip flop 34 generates output signals at the high level, it causes the translated English word to be passed from the first translation circuit 10.

Upon output signals developed from the gate 35, the first driver 36 provides display signals. The display signals correspond with the input Japanese word stored in the input storage circuit 6 or the translated English word contained in the first translation circuit 10. The display signals from the first driver 36 are introduced into the upper indicator 41.

Figure 4:
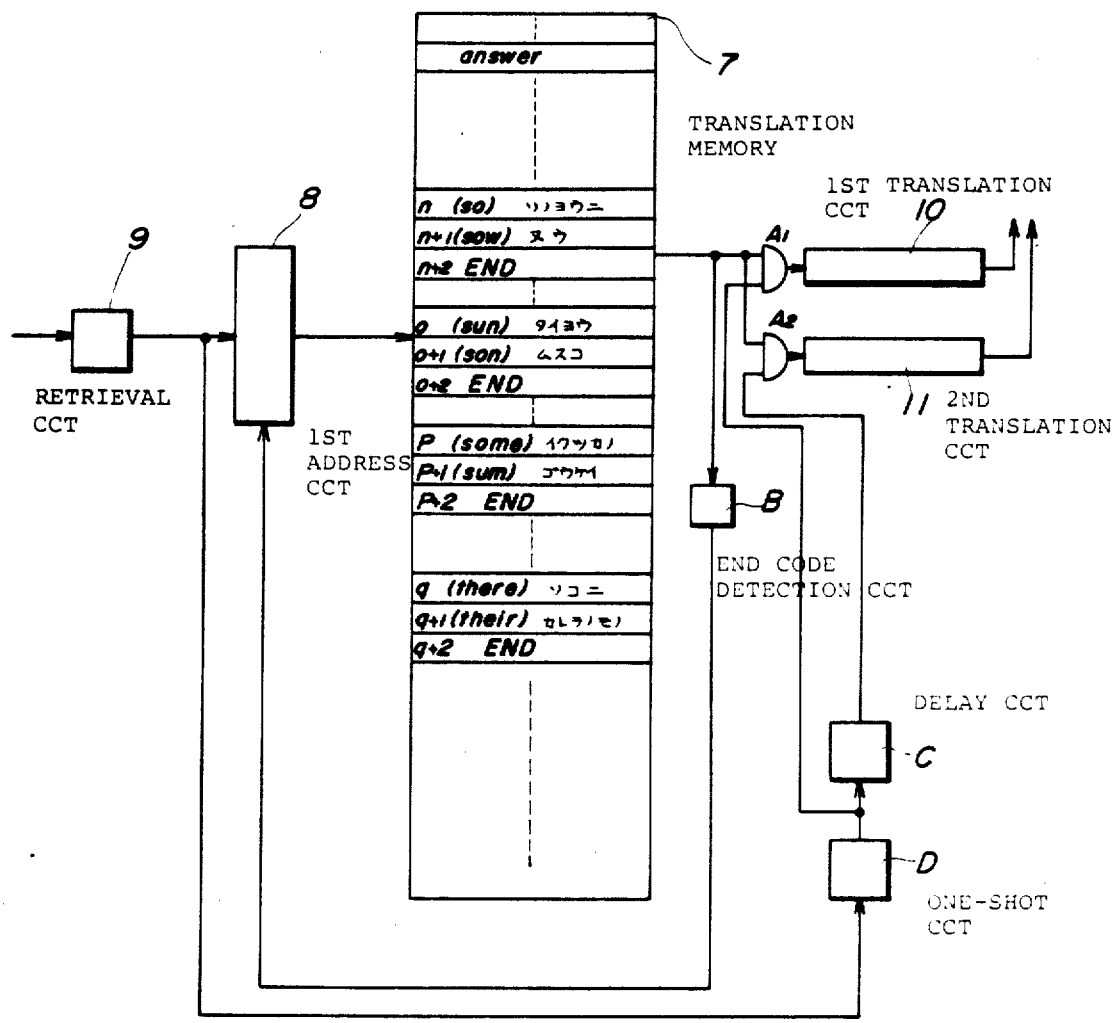
FIG. 4 is a more detailed block diagram of a translation memory 7 and associated circuitry contained within the control circuit depicted in FIG. 2.

In response to the output signals from the flip flop 34 in the low level, the gate 37 conducts the "Katakana" letters stored in the "Katakana" letter storage circuit 14 to the second driver 38. When the output signal from the flip flop 34 is at the high level, it conducts the translated English word stored in the second translation circuit 11 to the same. By output signals from the gate 37, the second driver 38 provides the display signals, similarily. These display signals are concerned with the "Katakana" letters from the "Katakana" letter storage circuit 14 or the translated English word from the second translation circuit 11. These display signals from the second driver 38 are admitted to the lower indicator 42. FIG. 4 is a more detailed block diagram of the translation circuit 7 and circuit elements connected thereto, wherein at least one pair of homonyms, words having the same sound as another word but a different meaning and different spelling, are examined according to the application of the sequence of the phonetic symbols.

The sequence of the phonetic symbols is entered by a phonetic-symbol keyboard. The phonetic-symbol keyboard comprises a plurality of phonetic-symbol key switches each of which is labeled by one phonetic symbol. Required phonetic symbol information is applied by the actuation of selected one of the phonetic-symbol key switches.

With reference to FIG. 4, there are provided the translation circuit 7, the first address circuit 8, the retrieval circuit 9, the two translation circuits 10 and 11, two AND gates A1 and A2, an end code detection circuit B, a delay circuit C, an one-shot circuit D.

The translation circuit 7 contains a plurality of pairs of homonyms, each of which is a word having the same sound as another word but a different meaning and different spelling, together with at least one translated Japanese word. In response to the application of a sequence of phonetic symbols by the phonetic-symbol keyboard, the retrieval circuit 9 provides address signals corresponding to the leading address preceding a train of addresses of the translation circuit 7 in which at least one pair of the homonyms of the English language are stored together with their translated Japanese words. The address signals are entered to the first address circuit 8.

For instance, a sequence of phonetic symbols of [si:] is applied to obtain two translated Japanese words. The leading address indicative of an address "o" to the translation circuit 7 is selected by the first address circuit 8. Accordingly, a translated Japanese word equivalent to an English word "sun" and stored in the "o" address is selected in the translation circuit 7. The translation circuit 7 delivers the translated Japanese word equivalent to the English word "sun" to the AND gate A1.

Since the address signals from the retrieval circuit 9 are applied to the one-shot circuit D, the one-shot circuit D generates output signals applied to the AND gate A1. The AND gate A1 is placed in conductive conditions, with the result that the translated Japanese word delivered is transmitted to the first translation circuit 10.

The first address circuit 8 then advances its address number to "o+1". The next address of "o+1" is selected in the translation memory 7 to select the information stored therein. In response to the application of the address signals to the one-shot circuit D, the one-shot circuit D develops an output signal to the delay circuit C. The delay circuit C generates an output signal which is entered into the AND gate A2, so that the AND gate A2 is placed in a conductive conditions in place of the AND gate A1. According to the selection of "o+1" address in the translation memory 7, a translated Japanese word equivalent to an English word "son" stored in "o+1" address is developed. This translated Japanese word is transmitted to the second translation circuit 11 through the AND gate A2 which is then in the conductive condition.

The two translated Japanese words stored in the two translation circuits 10 and 11 are transferred to and indicated in the display 4 as mentioned previously.

Subsequently, the first address circuit 8 advances the address number to be set to "o+2", in which end code information following the two translated Japanese words developed is stored. The end code information is developed from the translation memory 7. The generation of the end code information is detected by the end code detection circuit B. At the same time, the end code detection circuit B causes the first address circuit 8 to be placed in an inoperable state. The first address circuit 8 is thus prevented from advancing the address number further.

In another form of the present invention, the translation memory may contain a pair of English words, each having the same sound and the same spelling as another word but a different meaning. Some examples of such a pair of English words are as follows:

1. English word:
   Two translated Japanese words equivalent to:
   (i) take fire
   (ii) not having much weight.
2. English word: die
   Two translated Japanese words equivalent to:
   (i) come to the end of one's life
   (ii) a small cube having the sides marked with dots from one to six.

The invention being thus described, it will be obvious that the same may be varied in many ways. Such variations are not to be regarded as a departure from the spirit and scope of the invention and all such modifications are intended to be included within the scope of the following claims.

What is claimed is:

1. An electronic language interpreter device wherein a first word represented in the Japanese language is translated into a translated word in a different language but equivalent in meaning to the first word, comprising:

alphabetized Japanese word input means for entering said first word in the Japanese language into said device in the form of alphabetical characters, wherein said alphabetized Japanese word input means comprises an alphabetical keyboard containing a plurality of alphabetical key switches for introducing said first word into said device;

memory means for storing a plurality of words in said different language, wherein said different language is English;

converting and display means responsive to the alphabetized Japanese word input means for altering said first word in alphabetized Japanese into its corresponding representation in Japanese phonetic symbol characters and displaying said phonetic symbol representation thereof, wherein the converting and display means includes first converting means for providing information representing a syllabic nasal, second converting means for providing information representing an assimilated sound, third converting means for providing information representing a long vowel, and means for combining the information provided by said first, second and third converting means to form the phonetic symbol representation of said first word; and access means, responsive to the first word entered into said device by said alphabetized Japanese word input means, for retrieving from said memory means one of said plurality of words to develop said translated word having the same meaning as said first word.

2. The device according to claim 1, wherein said converting and display means is further responsive to the alphabetized Japanese word input means for displaying said first word in alphabetized Japanese.

3. The device according to claim 2, wherein said converting and display means comprises;

a first display portion responsive to said alphabetized Japanese word input means for displaying said first word of Japanese in alphabetical characters; and a second display portion responsive to said converting means for also displaying said first word in Japanese "Katakana" characters.

4. An electronic language interpreter device wherein a first word represented in a first language but having more than one meaning is translated into at least one translated word in a different language having a meaning equivalent to at least one meaning of the first word comprising:

input means for entering said first word in said first language wherein said input means includes an alphabetized word input means for entering said first word into said device in the form of alphabetical characters and wherein said first language is Japanese;

converting means, responsive to said first word entered into the alphabetized word input means, for converting the alphabetical character form of said first word into its representation in Japanese "Katakana" characters memory means for storing a plurality of words in said first language and corresponding words having the same meaning in said different language, at least one word in said first language corresponding in meaning to more than one of said corresponding words in said different language;

access means, responsive to said first word entered by said input means, for retrieving from said memory means at least one translated word having a first same meaning as said first word, said access means retrieving all translated words corresponding to said first same meaning of said first word;

means for displaying two translated words, when existing, corresponding to said first word; and voice synthesizer means, responsive to the entry of said first word in said input means, for developing an audible pronunciation of said first word in said first language.

5. An electronic language interpreter device wherein a first word represented in the Japanese language is translated into a translated word in a different language but equivalent in meaning to the first word, comprising:

alphabetized Japanese word input means for entering said first word in Japanese into said device in the form of alphabetical characters;

memory means for storing a plurality of words in said different language;

access means, responsive to said first word entered into said alphabetized Japanese word input means, for retrieving from said memory means said translated word having the same meaning as said first word;

converting means, responsive to the entry of said particular Japanese word by said alphabetized Japanese word input means, for converting said first word in alphabetized Japanese into its corresponding representation in Japanese "Katakana" characters; and display means responsive to said converting means and said input means for simultaneously displaying said first word both in said alphabetical characters and in said "Katakana" characters.

6. The device of claim 5 wherein said display means displays said translated word in response to retrieval by said access means.

* * * * *